United States Patent
Ponce Suarez et al.

(10) Patent No.: US 12,033,416 B2
(45) Date of Patent: Jul. 9, 2024

(54) DEVICES, SYSTEMS AND METHODS FOR ASSESSING A MATCH BETWEEN JOB DESCRIPTIONS AND RESUMES

(71) Applicant: Atos IT Solutions and Services, Inc., New Castle, DE (US)

(72) Inventors: Javier Ponce Suarez, Brooklyn, NY (US); Oscar Vergé Arderiu, Brooklyn, NY (US); Mandar Naik, Mumbai Maharashtra (IN); Ruben Robledo Velazquez, Valladolid (ES)

(73) Assignee: ATOS France, Bezons (FR)

( * ) Notice: Subject to any disclaimer, the term of this patent is extended or adjusted under 35 U.S.C. 154(b) by 813 days.

(21) Appl. No.: 17/140,317

(22) Filed: Jan. 4, 2021

(65) Prior Publication Data

US 2022/0215196 A1    Jul. 7, 2022

(51) Int. Cl.
| | |
|---|---|
| *G06V 30/418* | (2022.01) |
| *G06F 18/21* | (2023.01) |
| *G06F 18/214* | (2023.01) |
| *G06F 18/2411* | (2023.01) |
| *G06N 20/00* | (2019.01) |
| *G06Q 10/1053* | (2023.01) |

(Continued)

(52) U.S. Cl.
CPC .......... *G06V 30/418* (2022.01); *G06F 18/214* (2023.01); *G06F 18/2178* (2023.01); *G06F 18/2411* (2023.01); *G06N 20/00* (2019.01); *G06Q 10/1053* (2013.01); *G06V 30/414* (2022.01)

(58) Field of Classification Search
None
See application file for complete search history.

(56) References Cited

U.S. PATENT DOCUMENTS

| | | | |
|---|---|---|---|
| 9,665,641 B1 | 5/2017 | Zhang | |
| 9,773,225 B2 * | 9/2017 | Jeffries | ........... G06Q 10/10 |

(Continued)

FOREIGN PATENT DOCUMENTS

| | | | |
|---|---|---|---|
| CN | 110991988 A | * | 4/2020 |
| CN | 111461637 | * | 7/2020 |

*Primary Examiner* — Mohammed Rachedine
(74) *Attorney, Agent, or Firm* — ARC IP Law, PC; Joseph J. Mayo

(57) ABSTRACT

The invention relates to a device for assessing a match between job descriptions and resumes. The device comprises:
 a memory for storing,
  a first database comprising one or more job description documents, each job description document defining a description of a job, and
  a second database comprising one or more resume documents, each resume document defining a resume for applying to a job description,
 a receiver for receiving a matching request from a user,
 a first machine learning engine for determining a correlation between the matching request and a keyword-based data structure, the keyword-based data structure defining, for each document of the first database and the second database, one or more predefined keywords that have been found in the document, the first machine learning engine implementing a classification algorithm, and
 at least one processor for generating a matching score based on the strength of the correlation.

The invention also to a system and a method thereof.

14 Claims, 3 Drawing Sheets

(51) Int. Cl.
*G06V 30/19* (2022.01)
*G06V 30/414* (2022.01)

(56) References Cited

U.S. PATENT DOCUMENTS

| | | |
|---|---|---|
| 10,691,732 B1 | 6/2020 | Zhang |
| 11,238,410 B1 * | 2/2022 | Wright .................. G06N 20/00 |
| 2021/0233029 A1 * | 7/2021 | Mittal ................ G06Q 10/1053 |
| 2022/0051080 A1 * | 2/2022 | Hajarnis ................ G06N 3/044 |

* cited by examiner

12,033,416 B2

DEVICES, SYSTEMS AND METHODS FOR ASSESSING A MATCH BETWEEN JOB DESCRIPTIONS AND RESUMES

TECHNICAL FIELD

This invention relates to information retrieval from databases and, more particularly, to devices, systems and methods for assessing a match between job descriptions and resumes.

Similar methods, devices and systems are known from U.S. Pat. No. 9,665,641B1 and U.S. Ser. No. 10/691,732B1.

BACKGROUND ART

For too many years, recruiting and hiring have followed the same tedious process: source candidates, review resumes, screen candidates on the phone, conduct in-person interviews, and then—hopefully—hire the best person.

Since recently, hiring remained very similar to how things have been done for years with paper resumes and written applications—and that's despite an overwhelming number of new technologies becoming available.

However current solutions are not satisfactory and therefore, there is a need in the art for an employment recruiting system that automates the tasks involved in sourcing, screening and presenting qualified job applicants to an employer with employment needs.

SUMMARY OF INVENTION

Embodiments of the invention provide a device, a system and a method for assessing a match between job descriptions and resumes, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DESCRIPTION OF EMBODIMENTS

The invention relates to a device 100 configured for assessing a match between job descriptions and resumes.

In the context of the invention, one should understand that a job description is a document, directed to job applicants, that clearly states the essential job requirements, job duties, job responsibilities, and skills required to perform a specific role. In other words, a job description defines what a role is, what skills, experience and/or degrees are required to perform it, and where the role fits in an organization. Job descriptions are also known as job specifications, job profiles, and position descriptions. From the organization's perspective, a job description is vital in ensuring that the applications received for the position closely match the needs of the role itself.

Also, in the context of the invention, one should understand that a resume is a document, directed to organizations, that clearly lists one's professional work experience, education, skills and achievements.

Finally, in the context of the invention, one should understand that a match occurs between a job description and a resume when the statement of the job description substantially fits with the listing of the resume.

In particular, the invention enables a bidirectional search such that device 100 is configured return at least one resume or at least one job description, depending on a given request.

Figure 1:
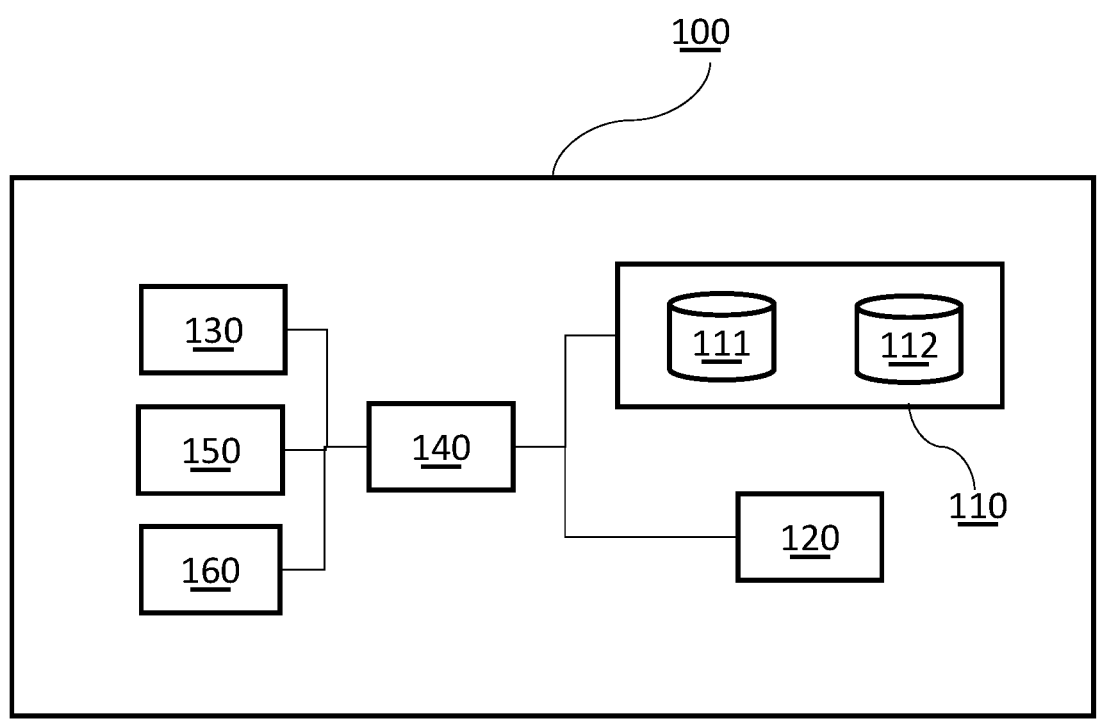
FIG. 1 is a block diagram showing a device according to an embodiment of the invention.

Turning to FIG. 1, the device 100 comprises a memory 110, a receiver 120, a first machine learning engine 130 and at least one processor 140.

The memory 110 is configured for storing a first database 111 and a second database 112.

In an example, the memory 110 may be a volatile memory, such as a random-access memory. The memory may also be a non-volatile memory, such as a read-only memory, a flash memory, a hard disk drive or a solid-state drive; or a combination of the foregoing types of memories.

In another example, the first database 111 and the second database 112 may be represented in a variety of forms including data storage files, lookup tables, or a database management system (DBMS) executing on one or more database servers. The database management system may be a relational (RDBMS), hierarchical (HDBMS), multidimensional (MDBMS), object oriented (ODBMS or OODBMS) or object relational (ORDBMS) database management system.

The first database 111 comprises one or more job description documents wherein each job description document defines a description of a job, as explained above.

The second database 112 comprises one or more resume documents wherein each resume document defines a resume for applying to a job description, as explained above.

In an embodiment, the first database 111 and the second database 112 may be comprised in a single database, rather than in several databases.

The receiver 120 is configured for receiving a matching request from a user.

In a first embodiment, the matching request comprises on one or more keywords entered by the user.

In an example, the terms "Information systems coordination" and "IT management" may be used to search for a $2^{nd}$ line Support Engineering job description or for a $2^{nd}$ line Support Engineer.

In another example, the terms "Project management", "Requirements definition and management", "Programming/Software development" and "Testing" may be used to search for a Project management job description or for a Project manager.

In a second embodiment, the matching request comprises at least one document provided by the user.

In an example, the format of the document may be of any type such as PDF, HTML, TXT, XPS or ePub.

Furthermore, in that embodiment, the device 100 comprises a second machine learning engine 150.

The second machine learning engine 150 is configured for extracting, by implementing a supervised learning algorithm, one or more keywords from the provided document.

In particular, based on a set of training dataset pairs with sufficiently diverse set of metrics, the second machine learning engine 150 has been trained to determine whether one or more predefined keywords are found in a given document.

Besides, the processor 140 is further configured for using the one or more predefined keywords as the matching request.

In an example, the second machine learning engine 150 is selected from a group consisting of an artificial neural network and a support vector machine.

Returning to FIG. 1, the first machine learning engine 130 is configured for determining, by implementing a classification algorithm, a correlation between the matching request and a keyword-based data structure.

In a first embodiment, the classification algorithm is selected from a group consisting of decision trees, classification rules, function models, and instance-based learner methods.

In particular, the keyword-based data structure defines, for each document of the first database 111 and the second database 112, one or more predefined keywords that have been found in the document.

In an example, the one or more predefined keywords comprise a skill, a position, a job role, an education level.

The keyword-based data structure may be obtained from a combination of the second machine learning engine 150 and the processor 140.

Indeed, in an embodiment, the second machine learning engine 150 is also configured for extracting, by implementing a supervised learning algorithm, one or more keywords from each document of the first database 111 and the second database 112. In particular, the second machine learning engine 150 has also been trained to determine whether one or more predefined keywords are found in a given document.

Besides, the processor 140 is also configured for populating the keyword-based data structure so as to associate each document of the first database 111 and the second database 112 with the respectively found one or more keywords.

Returning to FIG. 1, the processor 140 is further configured for generating a matching score based on the strength of the correlation.

Later, the strength of correlation may be displayed as a result, to a user of the device 100.

In an example, for a given matching request, one could select and display the job descriptions or resumes where the strength of correlation is beyond a predefined correlation strength value.

In a particular embodiment, the device 100 comprises a third machine learning engine 160.

The third machine learning engine 160 is configured for extracting, by implementing a supervised learning algorithm, one or more degrees of expertise for each of the one or more keywords respectively found in a given document.

In particular, based on a set of training dataset pairs with sufficiently diverse set of metrics, the third machine learning engine 160 has been trained to determine a degree of expertise of a predefined keyword found in a given document.

In the context of the invention, a degree of expertise defines a level of mastery of a given skill. For example, if a resume comprises a level of mastery of "C++ programming" expressed, for instance, over a scale extending from a first value to a fifth value, the third machine learning engine 160 is capable of extracting the appropriate value expressed in the resume. Of course, the third machine learning engine 160 is also capable of doing the same within a job description document.

Besides, in this particular embodiment, the processor 140 is further configured for populating the keyword-based data structure so as to associate each of the one or more keywords respectively found in a given document with the respectively found one or more degrees of expertise.

In an example, the third machine learning engine 160 is selected from a group consisting of an artificial neural network and a support vector machine.

Figure 2:
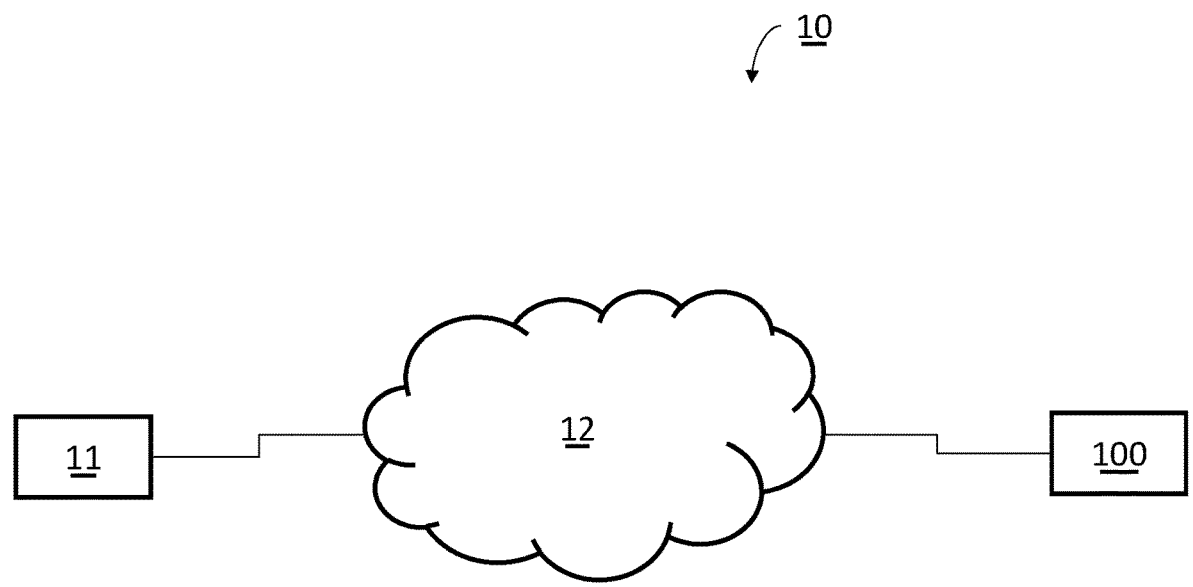
FIG. 2 is a block diagram showing a system according to an embodiment of the invention.

Turning to FIG. 2, the invention also relates to a computer system 10 for assessing a match between job descriptions and resumes.

In FIG. 2, the computer system 10 comprises a user interface 11, the device 100 and a cloud network 12.

The user interface 11 is configured for allowing a user to enter a matching request. Furthermore, the user interface 11 is also configured for visualizing the results, as explained above.

In a first example, the user interface 11 is a graphical user interface (GUI).

In the context of the invention, a GUI is a type of user interface that allows users to interact with electronic devices with images rather than text commands. A GUI represents the information and actions available to a user through graphical icons and visual indicators, as opposed to text-based command interfaces. Actions are usually performed by a user through direct manipulation of the graphical elements.

In a second example, the user interface 11 is an application programming interface to other programming languages.

The cloud network 12 comprises a multi-tenant platform runtime system, a plurality of web servers, and one or more virtualized SaaS applications.

In particular, the user interface 11 is hosted in a virtualized SaaS application of the cloud network 12.

In an example, the virtualized SaaS application is a web application.

In the context of the invention, a SaaS application runs on virtual machines of cloud network 12. This way, the SaaS application is accessible from various client devices through a thin client interface.

In another example, the cloud network 12 can be established using Wi-Fi, cellular, or other communication technologies. In some embodiments, the cloud network 12 can be an internal network that is limited to one or more specific locations. In some embodiments, the cloud network 12 can be located (or extend) remotely. In some embodiments, the cloud network 12 can provide connection means to the Internet and/or to remote data storage.

Furthermore, the first machine learning engine 130, the second machine learning engine 150 and the third machine learning engine 160 are hosted on one or more of the plurality of web servers.

Figure 3:
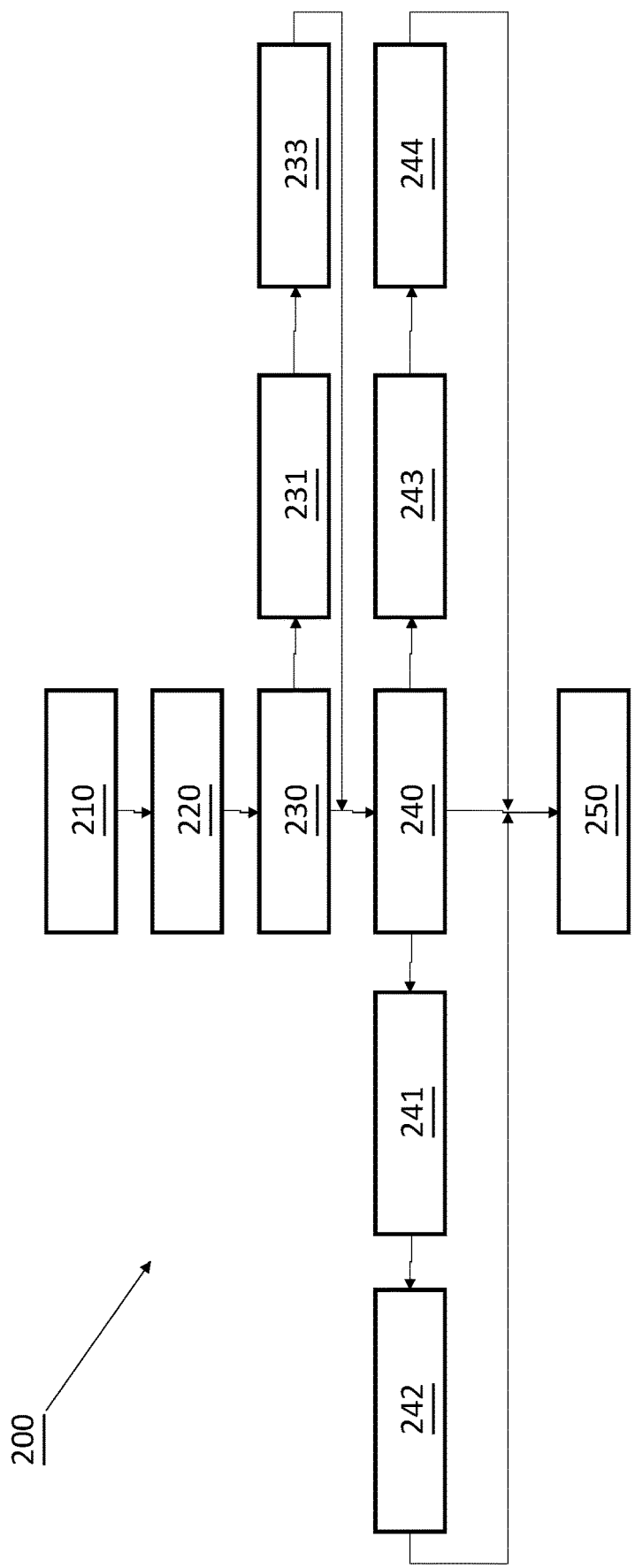
FIG. 3 is a flow chart showing a method according to an embodiment of the invention.

Turning to the FIG. 3, the invention also relates to a computer-implemented method 200 for assessing a match between job descriptions and resumes.

At step 210, the method 200 obtains, from a memory, a first database comprising one or more job description documents, each job description document defining a description of a job, as already explained above.

At step 220, the method 200 obtains, from the memory, a second database comprising one or more resume documents, each resume document defining a resume for applying to a job description, as already explained above.

In a first embodiment of step 210 and step 220, the method 200 further comprises additional steps.

In particular, at step 241, the method 200 extracts, by a second machine learning engine implementing a supervised learning algorithm, one or more keywords from each document of the first database 111 and the second database 112, the second machine learning engine having been trained to determine whether one or more predefined keywords are found in a given document.

Then, at step 242, the method 200 populates a keyword-based data structure so as to associate each document of the first database 111 and the second database 112 with the respectively found one or more keywords.

In an example, the one or more predefined keywords comprise a skill, a position, a job role, an education level, as already explained above.

In a second embodiment of step 210 and step 220, the method 200 further comprises additional steps.

In particular, at step 243, the method 200 extracts, by a third machine learning engine implementing a supervised learning algorithm, one or more degrees of expertise for each of the one or more keywords respectively found in a given document, the third machine learning engine having been trained to determine a degree of expertise of a predefined keyword found in a given document.

Then, at step 244, the method 200 populates the keyword-based data structure so as to associate each of the one or more keywords respectively found in a given document with the respectively found one or more degrees of expertise.

In an example, the one or more predefined keywords comprise a skill, a position, a job role, an education level, as already explained above.

At step 230, the method 200 receives a matching request from a user.

In a first embodiment, the matching request comprises on one or more keywords entered by the user, as already explained above.

In a second embodiment, the matching request comprises at least one document provided by the user. In that case, the methods 200 further comprises additional steps.

In particular, at step 231, the method 200 extracts, by a second machine learning engine implementing a supervised learning algorithm, one or more keywords from the document, the second machine learning engine having been trained to determine whether one or more predefined keywords are found in a given document. Then, at step 232, the method 200 uses the one or more predefined keywords as the matching request.

At step 240, the method 200 determines, by a first machine learning engine implementing a classification algorithm, a correlation between the matching request and the keyword-based data structure, the keyword-based data structure defining, for each document of the first database 111 and the second database 112, one or more predefined keywords that have been found in the document.

At step 250, the method 200 generates, by a processor, a matching score based on the strength of the correlation In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices or logic blocks to achieve the same functionality is effectively "associated" such that the desired functionality is achieved. Hence, any two devices or logic blocks herein combined to achieve a particular functionality may be seen as "associated with" each other such that the desired functionality is achieved, irrespective of architectures or intermediate devices. Likewise, any two devices or logic blocks so associated can also be viewed as being "operably connected," or "operably coupled," to each other to achieve the desired functionality.

Furthermore, those skilled in the art will recognize that boundaries between the above-described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or operations than those listed in a claim. Furthermore, the terms "a" or "an" as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A device configured for assessing a match between job descriptions and resumes, the device comprising:
    a memory that stores
        a first database comprising one or more job description documents, each job description document of the one or more job description documents defining a description of a job, and
        a second database comprising one or more resume documents, each resume document of the one or more resume documents defining a resume for applying to a job description,
    a receiver configured to receive a matching request from a user, wherein the matching request comprises at least one document provided by the user,
    a first machine learning engine configured to determine a correlation between the matching request and a keyword-based data structure, the keyword-based data structure defining, for said each job description document of the first database and for said each resume document of the second database, one or more predefined keywords that have been found in the each job description document and the each resume document, the first machine learning engine implementing a classification algorithm, at least one processor configured to generate a matching score based on a strength of the correlation, a second machine learning engine configured to extract one or more keywords from the each job description document and the each resume document, the second machine learning engine implementing a supervised learning algorithm and having been trained to determine whether said one or more predefined keywords are found in a given document, and wherein the at least one processor is further configured to use the one or more predefined keywords as the matching request.

2. The device of claim 1, wherein the classification algorithm is selected from a group consisting of decision trees, classification rules, function models, and instance-based learner methods.

3. The device of claim 1, further comprising:

the second machine learning engine further configured to extract said one or more keywords from said each job description document of the first database and said each resume document of the second database, the second machine learning engine implementing a supervised learning algorithm and having been trained to determine whether said one or more predefined keywords are found in said given document, and wherein the at least one processor populates the keyword-based data structure so as to associate said each job description document of the first database and said each resume document of the second database respectively with one or more keywords that are extracted.

4. The device of claim 3, wherein the second machine learning engine is selected from a group consisting of an artificial neural network and a support vector machine.

5. The device of claim 3, further comprising, a third machine learning engine configured to extract one or more degrees of expertise for each of the one or more keywords respectively found in said given document, the third machine learning engine implementing a supervised learning algorithm and having been trained to determine a degree of expertise of said one or more degrees of expertise of a predefined keyword found in said given document, and wherein the at least one processor populates the keyword-based data structure so as to associate each of the one or more keywords respectively found in said given document respectively with the one or more degrees of expertise that are extracted.

6. The device of claim 5, wherein the third machine learning engine is selected from a group consisting of an artificial neural network and a support vector machine.

7. A computer system configured to assess a match between job descriptions and resumes, the computer system comprising:

a user interface configured to allow a user to enter a matching request, a device configured for assessing said match between said job descriptions and said resumes, the device comprising a memory that stores a first database comprising one or more job description documents, each job description document of the one or more job description documents defining a description of a job, and a second database comprising one or more resume documents, each resume document of the one or more resume documents defining a resume for applying to a job description, a receiver configured to receive said matching request from said user, wherein the matching request comprises at least one document provided by the user, a first machine learning engine configured to determine a correlation between the matching request and a keyword-based data structure, the keyword-based data structure defining, for said each job description document of the first database and for said each resume document of the second database, one or more predefined keywords that have been found in the each job description document and the each resume document, the first machine learning engine implementing a classification algorithm, at least one processor configured to generate a matching score based on a strength of the correlation, a second machine learning engine configured to extract one or more keywords from the each job description document and the each resume document, the second machine learning engine implementing a supervised learning algorithm and having been trained to determine whether said one or more predefined keywords are found in a given document, and wherein the at least one processor is further configured to use the one or more predefined keywords as the matching request, the second machine learning engine further configured to extract said one or more keywords from said each job description document of the first database and said each resume document of the second database, the second machine learning engine implementing a supervised learning algorithm and having been trained to determine whether said one or more predefined keywords are found in a given document, wherein the at least one processor populates the keyword-based data structure so as to associate said each job description document of the first database and said each resume document of the second database respectively with said one or more keywords that are extracted, a third machine learning engine configured to extract one or more degrees of expertise for each of the one or more keywords respectively found in said given document, the third machine learning engine implementing a supervised learning algorithm and having been trained to determine a degree of expertise of a predefined keyword found in said given document, and wherein the at least one processor populates the keyword-based data structure so as to associate each of the one or more keywords respectively found in said given document respectively with the one or more degrees of expertise that are extracted, and a cloud network having a multi-tenant platform runtime system, a plurality of web servers, and one or more virtualized SaaS applications, wherein the user interface is hosted in a virtualized SaaS application, and the first machine learning engine, the second machine learning engine and the third machine learning engine are hosted on one or more of the plurality of web servers.

8. The computer system of claim 7, wherein the one or more virtualized SaaS applications is a web application.

9. The computer system of claim 7, wherein the user interface is a graphical user interface.

10. The computer system of claim 7, wherein the user interface is an application programming interface to other programming languages.

11. A computer-implemented method for assessing a match between job descriptions and resumes, the computer-implemented method comprising:
    obtaining, from a memory, a first database comprising one or more job description documents, each job description document of the one or more job description documents defining a description of a job,
    obtaining, from the memory, a second database comprising one or more resume documents, each resume document of the one or more resume documents defining a resume for applying to a job description,
    receiving a matching request from a user, wherein the matching request comprises at least one document provided by the user,
    extracting, by a second machine learning engine implementing a supervised learning algorithm, one or more keywords from the each job description document and the each resume document, the second machine learning engine having been trained to determine whether one or more predefined keywords are found in a given document,
    using the one or more predefined keywords as the matching request,
    determining, by a first machine learning engine implementing a classification algorithm, a correlation between the matching request and a keyword-based data structure, the keyword-based data structure defining, for said each job description document of the first database and for said each resume document of the second database, said one or more predefined keywords that have been found in the each job description document and each resume document, and
    generating, by a processor, a matching score based on a strength of the correlation.

12. The computer-implemented method of claim 11, further comprising,
    extracting, by the second machine learning engine implementing a supervised learning algorithm, said one or more keywords from said each job description document of the first database and the each resume document of the second database, the second machine learning engine having been trained to determine whether said one or more predefined keywords are found in said given document, and
    populating the keyword-based data structure so as to associate said each job description document of the first database and said each resume document of the second database respectively with said one or more keywords that are extracted.

13. The computer-implemented method of claim 12, further comprising,
    extracting, by a third machine learning engine implementing a supervised learning algorithm, one or more degrees of expertise for each of the one or more keywords respectively found in said given document, the third machine learning engine having been trained to determine a degree of expertise of a predefined keyword found in said given document, and
    populating the keyword-based data structure so as to associate said each of the one or more keywords respectively found in said given document respectively with the one or more degrees of expertise that are extracted.

14. The computer-implemented method of claim 11, wherein the one or more predefined keywords comprise one or more of a skill, a position, a job role, an education level.

* * * * *